(12) United States Patent
Arliaud et al.

(10) Patent No.: US 12,164,046 B2
(45) Date of Patent: Dec. 10, 2024

(54) METHOD FOR CONTROLLING THE ORIENTATION OF A SOLAR MODULE WITH TWO PHOTOACTIVE FACES

(71) Applicant: NEXTRACKER LLC, Fremont, CA (US)

(72) Inventors: Jérôme Arliaud, Pourrières (FR); Madyan Michotte De Welle, Marseilles (FR)

(73) Assignee: NEXTRACKER LLC, Fremont, CA (US)

( * ) Notice: Subject to any disclaimer, the term of this patent is extended or adjusted under 35 U.S.C. 154(b) by 63 days.

(21) Appl. No.: 17/872,762

(22) Filed: Jul. 25, 2022

(65) Prior Publication Data

US 2022/0365161 A1 Nov. 17, 2022

Related U.S. Application Data

(63) Continuation of application No. 17/107,665, filed on Nov. 30, 2020, now Pat. No. 11,397,235, which is a
(Continued)

(30) Foreign Application Priority Data

Jan. 4, 2016 (FR) ...................................... 1650013

(51) Int. Cl.
*G01S 3/78* (2006.01)
*F24S 23/70* (2018.01)
(Continued)

(52) U.S. Cl.
CPC ............. *G01S 3/7861* (2013.01); *F24S 23/70* (2018.05); *H02S 20/10* (2014.12); *H02S 20/32* (2014.12);
(Continued)

(58) Field of Classification Search
CPC .......... F24S 23/70; H02S 20/32; H02S 30/00; G01S 3/7861
See application file for complete search history.

(56) References Cited

U.S. PATENT DOCUMENTS

| 4,013,885 | A  | 3/1977  | Blitz   |
| 9,494,340 | B1 | 11/2016 | O'neill |

(Continued)

FOREIGN PATENT DOCUMENTS

| CN | 105680779  | A | 6/2016 |
| JP | 2012146967 | A | 8/2012 |

(Continued)

OTHER PUBLICATIONS

Examination Report No. 1 issued in Australian Patent application No. 2022201054 dated Feb. 14, 2023, 4 pages.
(Continued)

*Primary Examiner* — Kevin K Pyo
(74) *Attorney, Agent, or Firm* — Fredrikson & Byron, P.A.

(57) ABSTRACT

A method for controlling the orientation of a solar module including a single-axis solar tracker orientable about an axis of rotation, and a photovoltaic device supported by said tracker and having upper and lower photoactive faces, including: measurement of a distribution of the solar luminance called incident luminance originating from the incident solar radiation coming from the sky to reach the upper face, said distribution being established according to several elevation angles; measurement of a distribution of the solar luminance called reflected luminance originating from the albedo solar radiation corresponding to the reflection of the solar radiation on the ground to reach the lower face, said distribution being established according to several elevation angles; determination of an optimum orientation considering the measurements of said distributions of the incident and
(Continued)

(a)

(b)

(c)

(d)

reflected solar luminance; and servo-control of the orientation of the module on said optimum orientation.

14 Claims, 6 Drawing Sheets

Related U.S. Application Data continuation of application No. 16/067,925, filed as application No. PCT/FR2016/053671 on Dec. 27, 2016, now Pat. No. 10,852,385.

(51) Int. Cl.
*G01S 3/786* (2006.01)
*H02S 20/10* (2014.01)
*H02S 20/32* (2014.01)
*F24S 30/425* (2018.01)
*F24S 50/20* (2018.01)

(52) U.S. Cl.
CPC .............. *F24S 30/425* (2018.05); *F24S 50/20* (2018.05); *F24S 2050/25* (2018.05); *F24S 2201/00* (2018.05)

(56) References Cited

U.S. PATENT DOCUMENTS

| | | |
|---|---|---|
| 2008/0295883 A1 | 12/2008 | Ducellier et al. |
| 2010/0000517 A1 | 1/2010 | Zalusky |
| 2011/0083718 A1 | 4/2011 | Wichner |
| 2013/0042901 A1 | 2/2013 | Deng |
| 2019/0190440 A1* | 6/2019 | Kingsley ................ H02S 20/32 |
| 2019/0353405 A1 | 11/2019 | Saeed et al. |

FOREIGN PATENT DOCUMENTS

| | | |
|---|---|---|
| JP | 2013152156 A | 8/2013 |
| KR | 101136597 B1 | 4/2012 |
| WO | 2013136171 A3 | 2/2014 |

OTHER PUBLICATIONS

Chinese Office Action issued in Chinese Patent Application No. 202010423616.5 dated Apr. 1, 2023. English translation not available.

Notice of Allowance issued in Mexican Patent Application No. MX/a/2018/008223 dated Mar. 8, 2023 with English translation.

Examination Report No. 1 issued in Australian Patent application No. 2016384284 dated Mar. 29, 2021, 5 pages.

Extended European Search Report issued in European Patent Application No. 20179241.3 dated Jul. 27, 2020, 9 pages. English translation not available.

International Search Report dated Apr. 26, 2017 re: Application No. PCT/FR2016/053671, pp. 1-3, citing US 2011/083718 A1, US 2008/295883 A1, US 2013/042901 A1, US 2010/000517 A1 and US 4 013 885 A.

Notice of Acceptance issued in Australian Application No. 2016384284 dated Nov. 3, 2021.

The First Office Action issued in corresponding Chinese Application No. 201680083151.5 dated May 15, 2019, with English translation, 20 pages.

The Second Office Action issued in corresponding Chinese Application No. 201680083151.5 dated Oct. 16, 2019, with English translation, 12 pages.

* cited by examiner

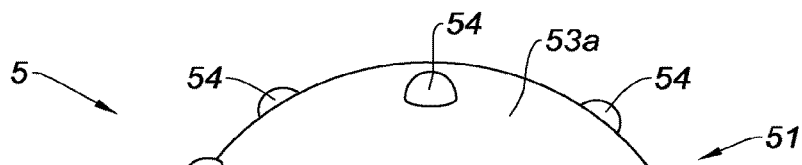
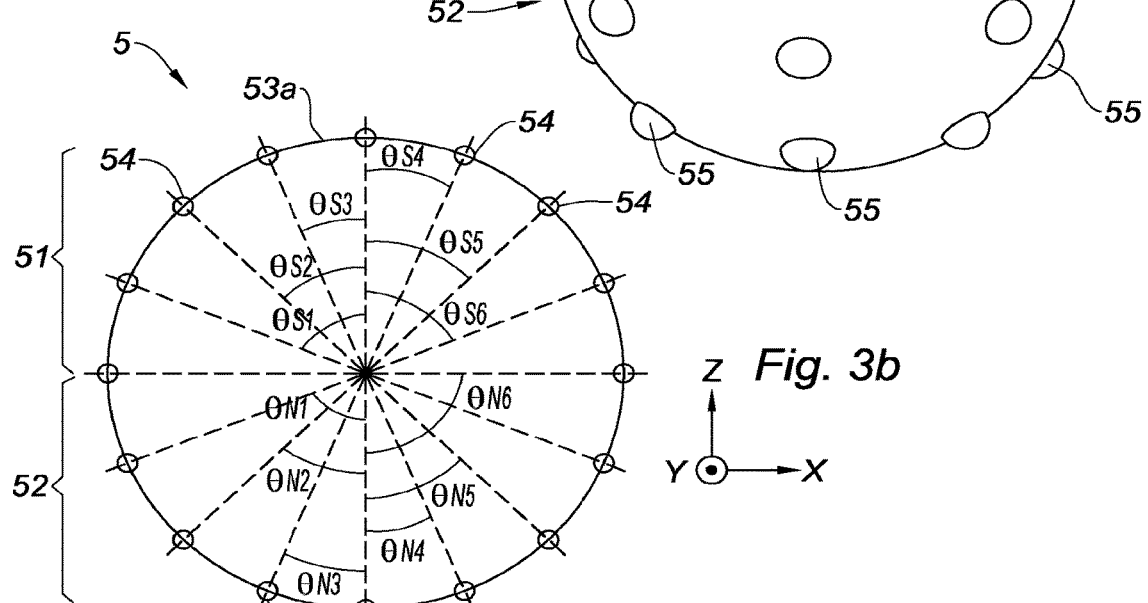
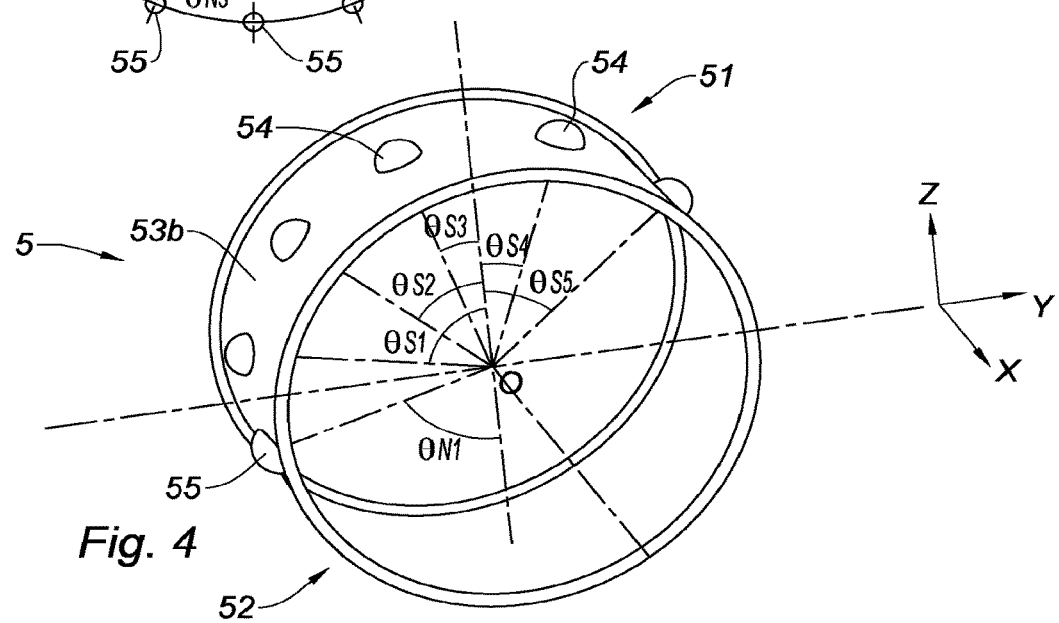

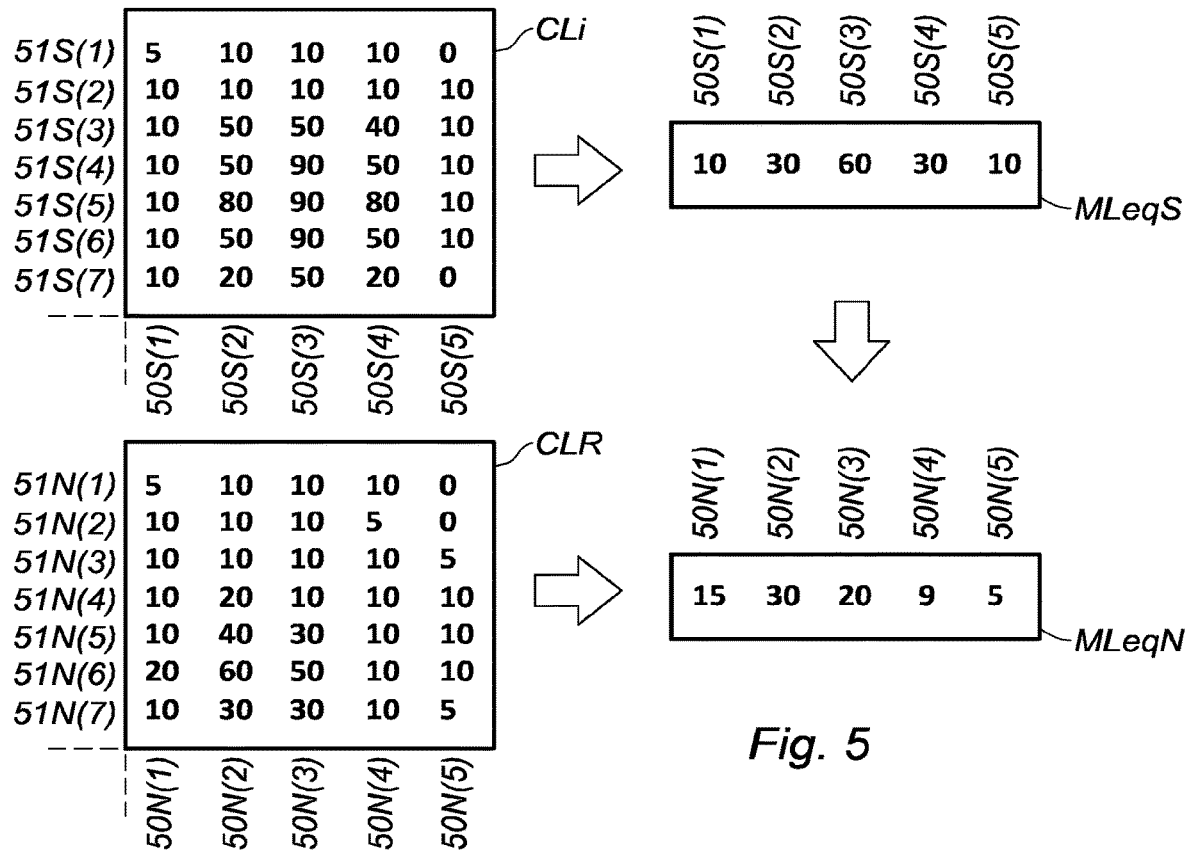
Fig. 5
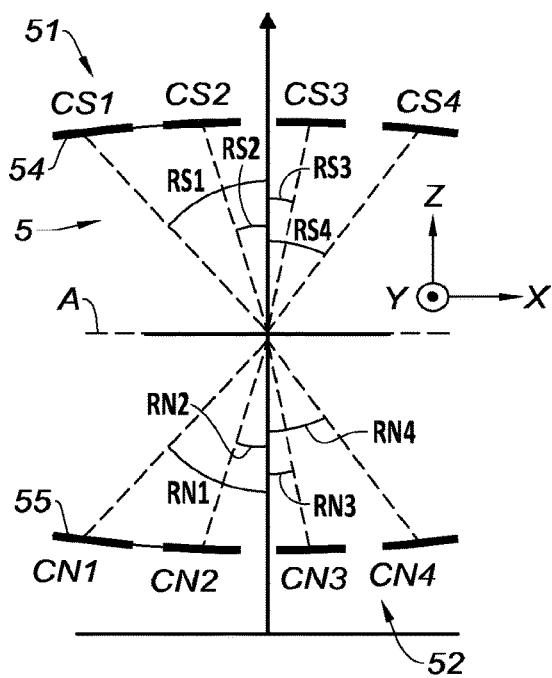
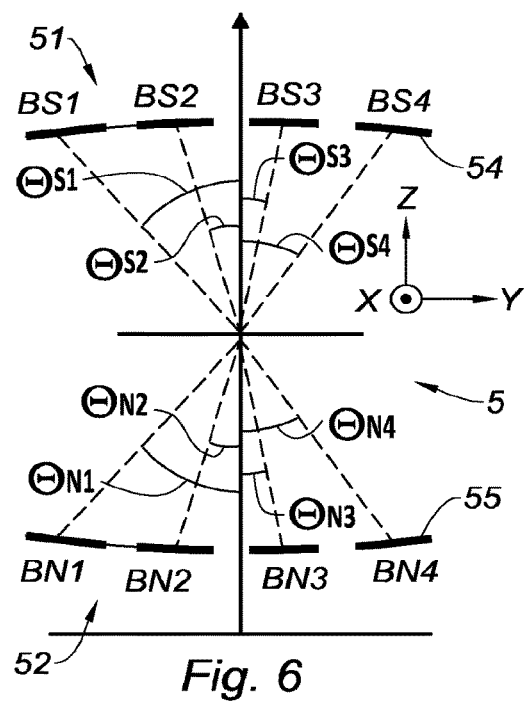
Fig. 6

METHOD FOR CONTROLLING THE ORIENTATION OF A SOLAR MODULE WITH TWO PHOTOACTIVE FACES

The present invention relates to a method for controlling the orientation of a solar module comprising:
- a single-axis solar tracker orientable about an axis of rotation for an orientation of the solar module allowing following the Sun during its rise and its descent from east to west; and
- a photovoltaic device supported by the solar tracker and having a photoactive upper face facing the sky and provided with photovoltaic cells and a photoactive lower face facing the ground and provided with photovoltaic cells.

Thus, the invention falls within the technical field of solar modules orientable about an axis of rotation and including a photovoltaic device of the dual-face technology, that is to say with a productive upper face facing the Sun and a lower face, also productive, facing the ground. The upper face benefits from the solar radiation called incident radiation, which corresponds to the direct and/or diffuse solar radiation which comes from the sky, whereas the lower face benefits from the solar radiation reflected by the ground, generally called albedo radiation.

It is common to servo-control the orientation of the solar tracker on an orientation called direct orientation based on an astronomical calculation of the position of the Sun, for a real-time positioning facing the Sun.

However, a servo-control on such a direct orientation has a major drawback by offering a yield deficit under certain weather conditions, and in particular under cloudy conditions which are at the origin of a diffuse solar radiation. The diffuse solar radiation arises when the direct solar radiation is dispersed in the clouds and the atmospheric particles. The diffuse solar radiation results from the diffraction of light by the clouds and by the various molecules in suspension in the atmosphere. Hence, the diffuse solar radiation does not necessarily follow the direction defined by the Sun in the direction of the observation point at the Earth's surface.

Furthermore, with a dual-face technology photovoltaic device, orientating the solar tracker on a direct orientation will not necessarily lead to a maximum energy yield on the lower face of the photovoltaic device, depending on the albedo.

The present invention aims at solving these drawbacks by proposing a controlling method which allows servo-controlling the solar module on an optimum orientation which will take into account at the same time the direct radiation, the diffuse radiation and the albedo radiation.

To this end, it proposes a method for controlling the orientation of a solar module comprising:
- a single-axis solar tracker orientable about an axis of rotation for an orientation of the solar module allowing following the Sun during its rise and its descent from east to west; and
- a photovoltaic device supported by said solar tracker and having a photoactive upper face facing the sky and provided with photovoltaic cells and a photoactive lower face facing the ground and provided with photovoltaic cells;

this method comprising the following successive steps:
- measurement of a distribution of the solar luminance called incident luminance originating from the solar radiation called incident radiation which comes from the sky and which is capable of reaching the upper face of the photovoltaic device, said distribution of the incident solar luminance being established according to several elevation angles corresponding to several orientations of the solar module about the axis of rotation;
- measurement of a distribution of the solar luminance called reflected luminance originating from the solar radiation called albedo radiation which corresponds to the reflection of the solar radiation on the ground and which is capable of reaching the lower face of the photovoltaic device, said distribution of the reflected solar luminance being established according to several elevation angles corresponding to several orientations of the solar module about the axis of rotation;
- determination of an optimum orientation of the solar module considering the measurements of the distribution of the incident solar luminance and of the distribution of the reflected solar luminance;
- servo-control of the orientation of the solar module on said optimum orientation.

Thus, the method implements a servo-control on an optimum orientation which not only takes into account the direct solar radiation, but also takes into account the diffuse solar radiation and the albedo radiation, so that the energy production of the upper face of the photovoltaic device resulting from both the direct radiation and the diffuse radiation, as well as the energy production of the lower face of the photovoltaic device resulting from the albedo radiation, will be take into consideration.

According to one feature, the controlling method comprises the following steps:
- memorization of the past measurements of the distribution of the incident solar luminance and of the distribution of the reflected solar luminance;
- memorization of the past optimum orientations determined for the past measurements of the distribution of the incident solar luminance and of the distribution of the reflected solar luminance;
- forecast of the future evolutions of the distribution of the incident solar luminance and of the distribution of the reflected solar luminance, on the basis of the past measurements of the distribution of the incident solar luminance and of the distribution of the reflected solar luminance;
- calculation of the future evolution of the optimum orientation according to the forecast of the future evolutions of the distribution of the incident solar luminance and of the distribution of the reflected solar luminance;
- servo-control of the orientation of the solar module on the optimum orientation according to the past optimum orientations and according to the future evolution of the optimum orientation.

Thus, a forecast of the future evolution of the optimum orientation, within a more or less short term, is implemented and, afterwards, according to this future evolution of the optimum orientation, a servo-control of the orientation of the solar module may be proactively implemented, without directly following in real-time the calculated optimum orientation, thereby allowing avoiding orientation changes that would procure only but little energy gain, and even energy losses, as would be the case for example if one single cloud passes in front of the Sun for a short time period.

According to another feature, the forecast of the future evolutions of the distribution of the incident solar luminance and of the distribution of the reflected solar luminance is based on a weather forecast calculation in a location area of the solar module.

According to a possibility of the invention, the determination of the optimum orientation of the solar module is based at least partially on a research, in the distribution of the incident solar luminance and in the distribution of the reflected solar luminance, of an elevation angle associated to a maximum solar illuminance on the two faces of the two faces of the photovoltaic device.

According to another possibility of the invention, the determination of the optimum orientation of the solar module is based at least partially on a research, in the distribution of the incident solar luminance and in the distribution of the reflected solar luminance, of an elevation angle associated to a maximum energy production of the solar module.

In a particular embodiment, the determination of the optimum orientation of the solar tracker is also based on the consideration of at least one of the following parameters:
- an electrical energy consumption necessary to modify the orientation of the solar module;
- a wear rate of mechanical members of the solar tracker loaded during a change of the orientation of the solar module;
- an angular speed of the solar tracker during a change of the orientation of the solar module;
- an angular displacement of the solar tracker between a minimum orientation and a maximum orientation.

Thus, when servo-controlling on an optimum orientation, the mechanical and kinematic constraints of the solar tracker are taken into consideration so that the servo-control does not become more damaging than beneficial.

Advantageously, when measuring the distribution of the incident solar luminance, is implemented a frequency weighting dependent of a frequency response of the photovoltaic cells of the upper face of the photovoltaic device; and when measuring the distribution of the reflected solar luminance, is implemented a frequency weighting dependent of a frequency response of the photovoltaic cells of the lower face of the photovoltaic device.

Thus, these frequency weightings will consist in applying frequency filters specific to each face which will take into account the spectral response of each face, to the extent that the spectral response of each face depends on the length of the light radiation received depending on its technology; the spectral response may vary between the two faces if these two faces are not of the same technology.

In a particular embodiment, at the step of determining an optimum orientation, the following steps are implemented:
- conversion of the measurement of the distribution of the incident solar luminance into an incident luminance mapping defining a distribution of luminance values according to strips called upper strips, established according to a horizontal first direction parallel to the axis of rotation, and according to columns called upper columns, established according to a horizontal second direction orthogonal to the first direction, where each upper strip is associated to an elevation angle and each upper column is associated to an azimuth angle;
- conversion of the measurement of the distribution of the reflected solar luminance into a reflected luminance mapping defining a distribution of luminance values according to strips called lower strips, established according to the first direction, and according to columns called lower columns, established according to the second direction, where each lower strip is associated to an elevation angle and each lower column is associated to an azimuth angle;
- calculation, for each upper and lower strip, of an equivalent luminance value from the set of luminance values taken in the considered strip;
- calculation, for several theoretical elevation angles corresponding to several orientations of the solar module, of values of the luminance perceived by the two faces of the photovoltaic device from the equivalent luminance values calculated for all the strips and from the angular differences between the theoretical elevation angles and the elevation angles associated to the strips;
- determination of a theoretical elevation angle associated to a maximum of the perceived luminance value and selection of said theoretical elevation angle as the optimum orientation.

In this manner, the calculation of the optimum orientation is based on the calculation of the perceived luminance values associated to different elevation angles which are to be matched with the orientation of the solar module. The smaller is the angular difference between the strips and the higher is the number of strips, the more the calculation of the optimum orientation will be fine and accurate.

In a first embodiment, the measurements of the distribution of the incident solar luminance and of the distribution of the reflected solar luminance are carried out by means of an image capturing device which ensures, on the one hand, a capture of images of the sky for measuring the distribution of the incident solar luminance and, on the other hand, a capture of images of the ground for establishing the measurement of the distribution of the reflected solar luminance.

With an image capture, the distributions of the incident and reflected solar luminances are measured from images which will afterwards be converted into luminance mappings.

In a second embodiment, the measurements of the distribution of the incident solar luminance and of the distribution of the reflected solar luminance are carried out by means of a measuring system comprising several photosensitive sensors, in particular pyranometric-type sensors, with, on the one hand, an upper measuring device having upper photosensitive sensors distributed facing the sky for measuring the distribution of the incident solar luminance and, on the other hand, a lower measuring device having lower photosensitive sensors distributed facing the ground for measuring the distribution of the reflected solar luminance.

With a measurement of the solar luminance by photosensitive sensors, the distributions of the incident and reflected solar luminances are measured from matrices of the measurements performed individually by each photosensitive sensor, these photosensitive sensors being positioned at different elevation angles (on the top and on the bottom), and in particular distributed over a sphere-shaped support, in order to offer a wide observation of the sky and of the ground.

According to a possibility of the invention, the step of servo-controlling the orientation of the solar module is carried out according to the energy consumption necessary to modify the orientation of the solar module.

In other words, the actual servo-control takes into account this energy consumption in order to implement, or not, an orientation according to the optimum orientation, so as to anticipate a change in the cloud coverage.

In accordance with another feature of the invention, at the step of servo-controlling the orientation of the solar module, is established a potential scenario during which the orientation of the solar module is modified starting from a current orientation until reaching the optimum orientation, and to this potential scenario are associated the calculations of:
- an evolution of the orientation of the solar module during the orientation change starting from the current orientation until reaching the optimum orientation, this evolution depending on the rotational displacement speed of the solar module;

an evolution of the energy consumption necessary to modify the orientation of the solar module;

an evolution of the supplemental solar energy production expected with such an orientation change;

an evolution of the expected energy yield based on the difference between the solar energy production and the energy consumption;

and afterwards, the orientation of the solar module is servo-controlled on said optimum orientation if the energy yield is globally positive for the scenario, otherwise the orientation of the solar tracker is maintained at the current orientation.

Thus, the servo-control according to an optimum orientation will not be performed unless an energy gain is obtained, in order not to implement a systematic orientation change at each change in the cloud coverage.

The invention also relates to a solar module comprising:

a single-axis solar tracker orientable about an axis of rotation for an orientation of the solar module allowing tracking the Sun during its rise and its descent from east to west, said solar tracker being actuatable in rotation about said axis of rotation by means of an actuation system;

a photovoltaic device supported by said solar tracker and having a photoactive upper face facing the sky and provided with photovoltaic cells and a photoactive lower face facing the ground and provided with photovoltaic cells;

this solar module being remarkable in that it further comprises:

an upper measuring device capable of measuring a distribution of the incident solar luminance originating from the incident solar radiation which comes from the sky and which is capable of reaching the upper face of the photovoltaic device, said distribution of the incident solar luminance being established according to several elevation angles corresponding to several orientations of the solar module about the axis of rotation;

a lower measuring device capable of measuring a distribution of the reflected solar luminance originating from the albedo solar radiation which corresponds to the reflection of the solar radiation on the ground and which is capable of reaching the lower face of the photovoltaic device, said distribution of the reflected solar luminance being established according to several elevation angles corresponding to several orientations of the solar module about the axis of rotation; and a control unit connected, on the one hand, to the upper and lower measuring devices and, on the other hand, to the actuation system for controlling the rotation of the solar tracker, where said control unit is configured to implement the steps of the controlling method in accordance with the invention.

Other features and advantages of the present invention will appear upon reading the detailed description hereinafter, of non-limiting examples of implementation, made with reference to the appended figures in which:

FIG. 1 comprises four diagrams each illustrating a solar module under cloudy (diagrams (a) and (b)) and clear (diagrams (c) and (d)) weather conditions;

FIG. 3a are schematic perspective (FIG. 3a) and vertical sectional (FIG. 3b) views of a first example of a measuring system;

FIG. 4 is a schematic perspective view of a second example of a measuring system;

FIG. 5 is a schematic representation of an incident luminance mapping (at the top-left) and of a matrix of equivalent luminance values (at the top-right) derived from this incident luminance mapping, and of a reflected luminance mapping (at the bottom-left) and of a matrix of equivalent luminance values (at the bottom-right) derived from this reflected luminance mapping;

Figure 7:
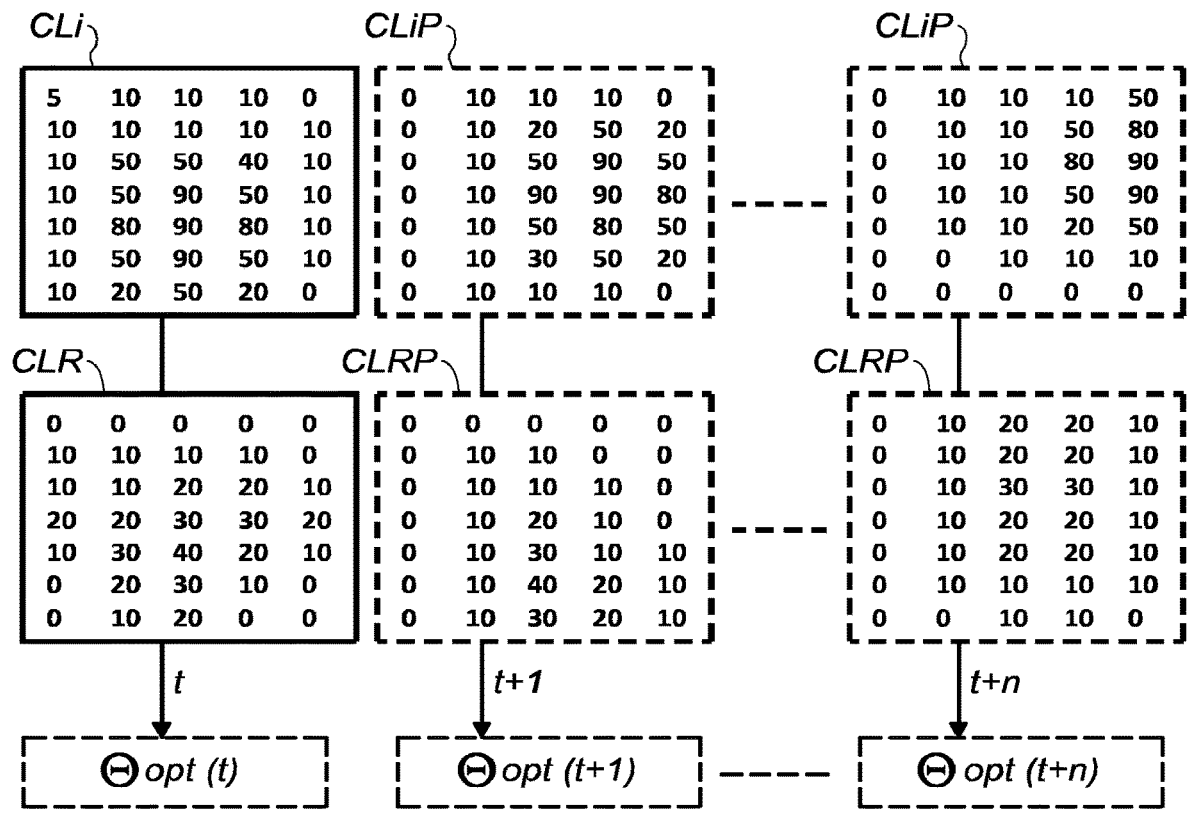
Figure 8:
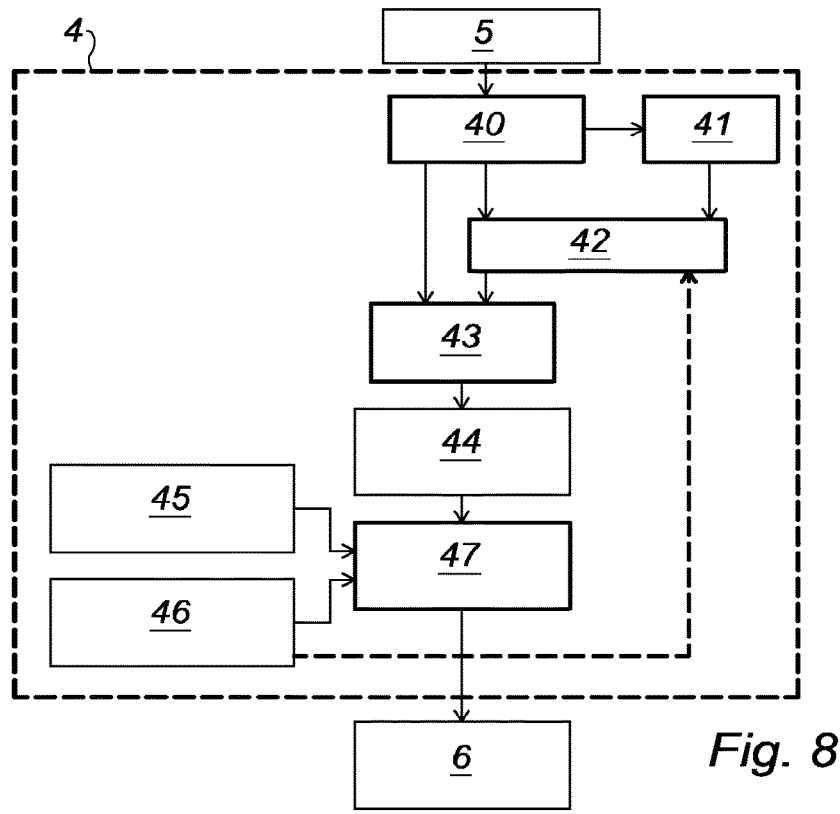
Figure 9:
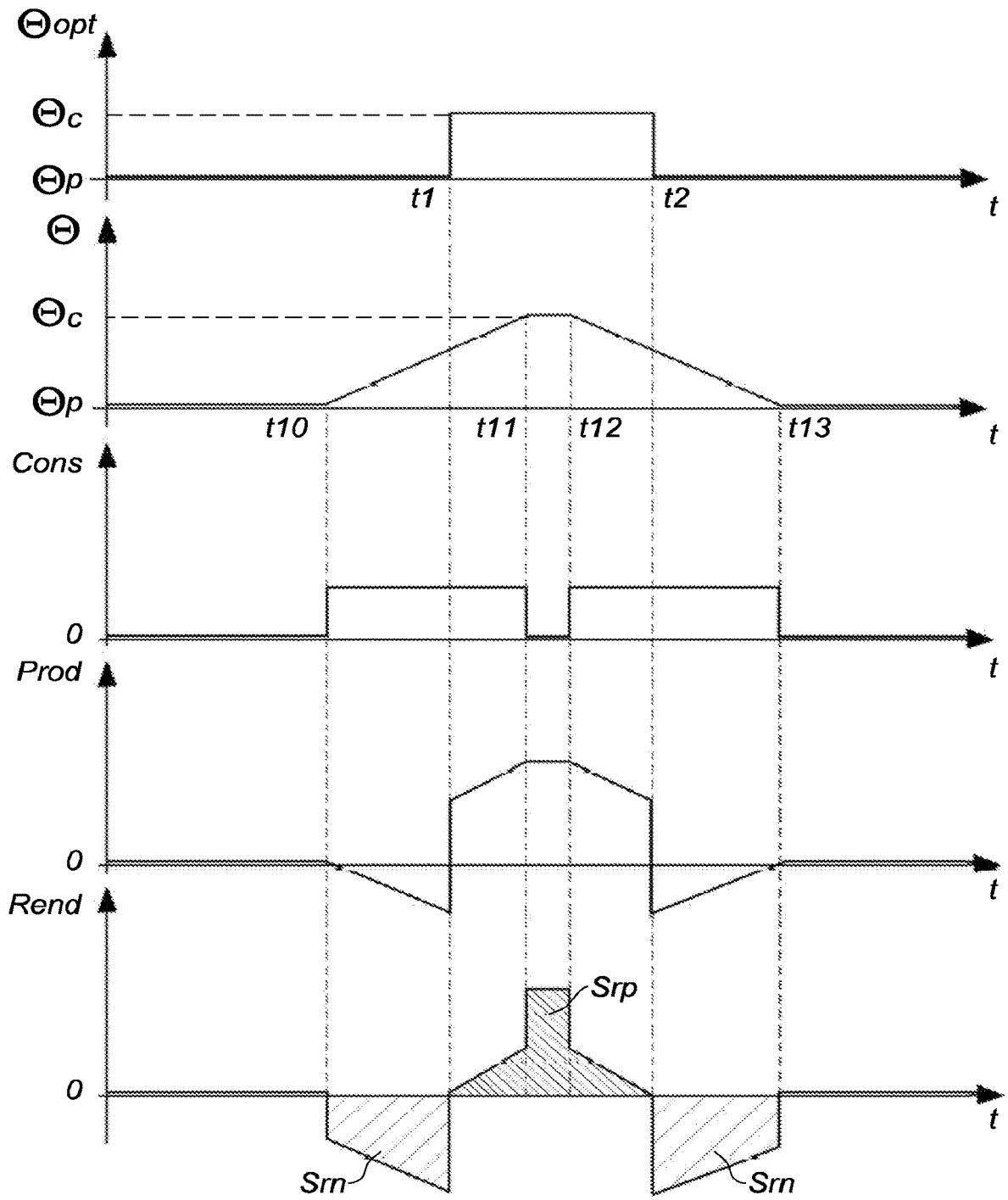
Figure 10:
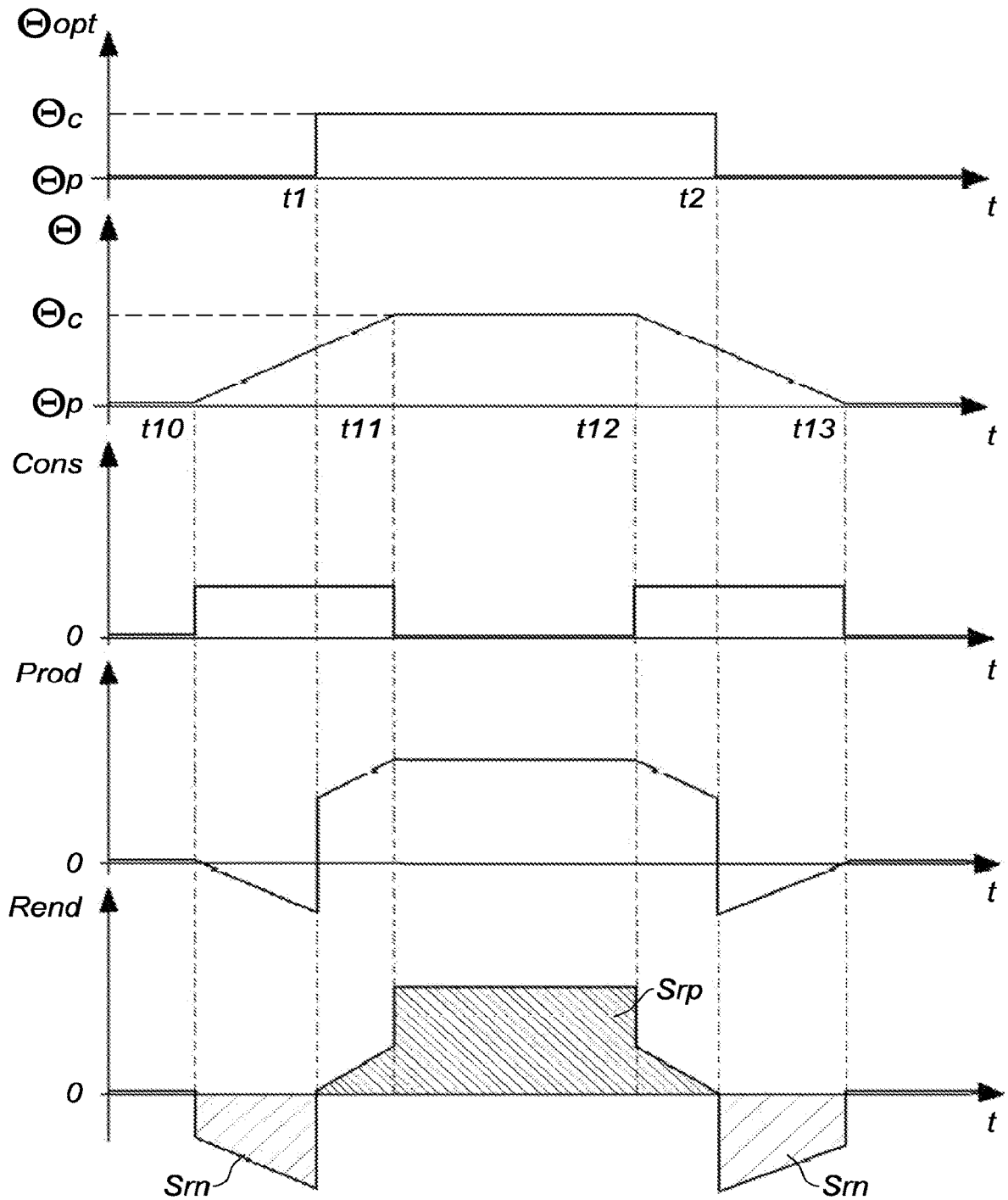

FIG. 6 comprises two diagrams, with:

at the left side, a schematic side view of four upper columns and four lower columns respectively of incident and reflected solar luminance mappings, with the azimuth angles associated to the different columns, in order to illustrate the calculation implemented for the calculation of an equivalent luminance value serving to determine the optimum orientation;

at the right side, a schematic side view of four upper strips and four lower strips respectively of incident and reflected solar luminance mappings, with the elevation angles associated to the different strips, in order to illustrate the calculation implemented for the calculation of a perceived luminance value serving to determine the optimum orientation;

FIG. 7 represents three pairs of incident and reflected solar luminance mappings, to which are associated below the corresponding optimum orientations, including a pair of mappings at a current time point (t) and two pairs of predictive mappings at future time points (t+1) and (t+n);

FIG. 8 is a representation in the form of a block diagram of the functional elements used for the implementation of a controlling method in accordance with the invention;

FIG. 9 represents five predictive curves calculated for a first potential scenario defined at the servo-control step, including, from top to bottom, a curve of the evolution of the future (or predictive) optimum orientation calculated at the forecasting step, a curve of the evolution of the orientation of the solar module, a curve of the evolution of the energy consumption necessary to modify the orientation of the solar module, a curve of the evolution of the expected supplemental solar energy production, and a curve of the evolution of the expected energy yield; and FIG. 10 represents five predictive curves (identical to those of FIG. 9) calculated for a second potential scenario.

Figure 2:
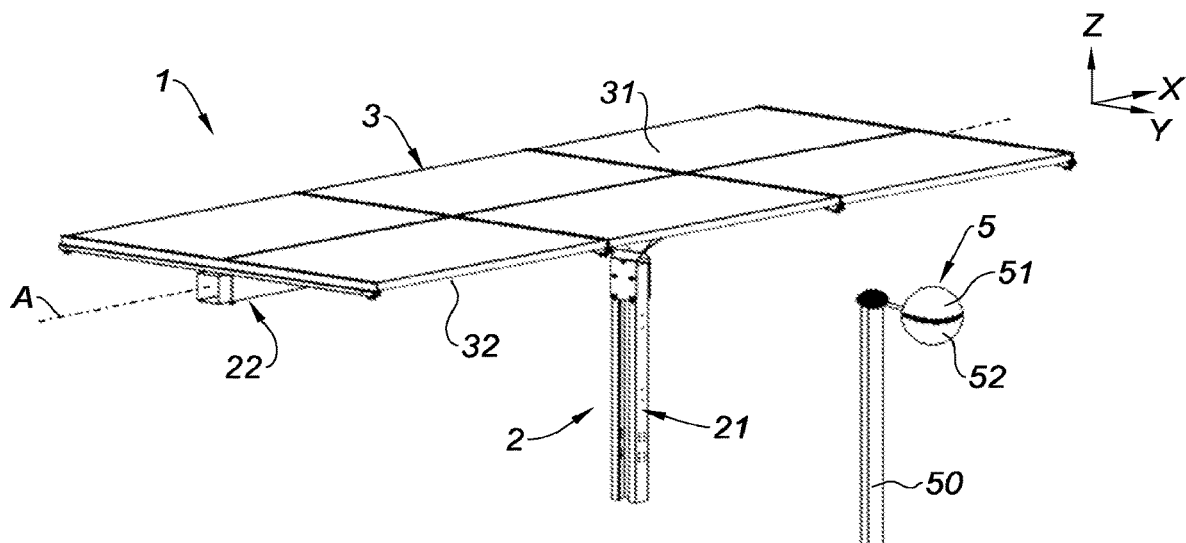
FIG. 2 is a schematic view of a solar module with a single-axis solar tracker in accordance with the invention, with an illustration of a measuring system capable of measuring a distribution of the incident solar luminance and a distribution of the reflected solar luminance.

Referring to FIG. 2, a solar module 1 comprises:

a single-axis solar tracker 2 orientable about an axis of rotation A for an orientation of the solar module 1 allowing tracking the Sun during its rise and its descent from east to west; and a photovoltaic device 3 supported by the solar tracker 1 and having a photoactive upper face 31 facing the sky and provided with photovoltaic cells and a photoactive lower face 32 facing the ground and provided with photovoltaic cells.

The solar tracker 2 comprises a fixed structure 21 for anchorage to the ground, for example constituted by one or several pylon(s) anchored to the ground, for example by pile driving, screwing, bolting, ballasting, or any other equivalent means allowing fastening and stabilizing the fixed structure 21 to the ground. The solar tracker 2 further comprises a movable platform 22 rotatably mounted on the fixed structure 21 about the axis of rotation A, and more specifically rotatably mounted on the upper ends of the pylon(s). This platform 22 supports the photovoltaic device 3 which is composed by one or several dual-face technology photovoltaic panel(s).

Referring to FIGS. 2 and 6, the axis of rotation A is substantially horizontal and directed according to a longitudinal axis X according to the north-south direction. When the solar module 1 is flat down (as shown in FIGS. 2 and 6), the faces 31, 32 of the photovoltaic device 3 extend according to a horizontal plane defined by the longitudinal axis X and by a transverse axis Y according to the east-west direction, orthogonally to a vertical axis Z.

In the following description, the orientation of the solar module 1 (also called orientation or inclination angle of the solar tracker 2 or of the photovoltaic device 3) corresponds to the angle of the normal to the upper face 31 with respect to the vertical axis Z considered in the plane (Y, Z). Thus, when the solar module 1 is flat down, this orientation is 0 degree.

The solar module 1 also comprises a measuring system 5 capable of measuring a distribution of the incident solar luminance and a distribution of the reflected solar luminance. This measuring system 5 may be associated to one single solar module 1 or, in an economical manner, be shared with several solar modules. The measuring system 5 is fixed, and may be raised with respect to the ground, for example by being mounted on a post 50.

This measuring system 5 comprises two measuring devices 51, 52, namely:
- an upper measuring device 51 capable of measuring a distribution of the incident solar luminance originating from the solar radiation called incident radiation (direct solar radiation Rdir and diffuse solar radiation Rdif) which comes from the sky and which is capable of reaching the upper face 31 of the photovoltaic device 3; and
- a lower measuring device 52 capable of measuring a distribution of the reflected solar luminance originating from the albedo solar radiation Ralb which corresponds to the reflection of the solar radiation on the ground and which is capable of reaching the lower face 32 of the photovoltaic device 3.

These two measuring devices 51, 52 may be separated or assembled together, as in the example of FIG. 2. With these measuring devices 51, 52, each distribution of the concerned (incident or reflected) solar luminance is established according to several elevation angles (angle measured with respect to the vertical axis Z in a vertical plane parallel to the longitudinal axis X) corresponding to several orientations of the solar module 1 about the axis of rotation A. In other words, these elevation angles are to be matched with the orientations of the solar module 1.

The solar module 1 further comprises an actuation system (not illustrated in FIG. 2 and bearing the reference number 6 in FIG. 10) which ensures rotating the platform 22 about the axis of rotation A.

This actuation system 6 comprises an actuator, for example of the (electric, pneumatic or hydraulic) cylinder type or of the electric motor (for example rotary motor) type. This actuation system 6 further comprises a mechanical system for transmitting the movement at the output of the actuator (a rotational movement for a rotary motor, or a linear movement for a cylinder) into a rotational movement of the platform 22. As a non-limiting example, this mechanical transmission system may be a deformable-parallelogram system, a pulley system, a pinion system, a chain system, a belt system, a clutch system, a transmission shaft system, a connecting rod system, etc.

It is possible to consider that the actuator is specific to the solar module 1, or is shared between several solar modules. In the case where the actuator is shared, the platforms 22 of the different solar trackers are advantageously coupled in rotation, for a synchronous rotation under the effect of the common actuator.

Referring to FIG. 8, the solar module 1 also comprises a control unit 4 such as an electronic board, which is linked to the observation system 5 in order to receive its observations (or observations data) and which is also linked to the actuation system 6 in order to pilot its operation and thus accordingly pilot the rotation of the platform 22, in other words the orientation of the solar module 1.

This control unit 4 comprises several modules, namely:
- a cartographic module 40 provided to convert the measurement performed by the upper measuring device 51 into an incident luminance mapping CLI, and to convert the measurement performed by the lower measuring device 52 into a reflected luminance mapping CLR, and to associate to each luminance mapping CLI, CLR a time point t;
- an archiving module 41 which archives each luminance mapping CLI, CLR generated by the cartographic module 40;
- a predictive calculation module 42 which calculates a future evolution of the distribution of the incident solar luminance and of the distribution of the reflected solar luminance (based on a weather forecast calculation), and more specifically calculates predictive incident luminance mappings CLIP and predictive reflected luminance mappings CLRP for future time points, this predictive calculation module 42 carrying out these calculations on the basis of the luminance mappings CLI, CLR generated in real-time by the cartographic module 40 and on the basis of the past luminance mappings CLI, CLR archived in the archiving module 41;
- an optimum orientation calculation module 43 which calculates the optimum orientation Θopt for each pair of luminance mappings CLI, CLR generated in real-time by the cartographic module 40 (in other words the optimum orientation at the current time point) and also for each pair of predictive mappings CLIP, CLRP originating from the predictive calculation module 42 (in other words the optimum orientations for future time points);
- an optimum orientation evolution module 44 which recovers all the optimum orientations originating from the optimum orientation calculation module 43 in order to establish the evolution of the optimum orientation, and therefore forecast and anticipate the optimum orientation changes;
- a module 45 for parametrizing the solar module 1 which comprises parameters related to the displacement speed of the actuation system 6 (and therefore to the speed necessary for an orientation change), parameters related to the energy consumption necessary to the actuation system 6 for an orientation change, parameters related to the solar energy production generated by the faces 31, 32 of the photovoltaic device 3 according to the solar luminance received on each face 31, 32, and parameters related to a wear rate of the mechanical members of the solar tracker 2 loaded during a change of the orientation of the solar module 1, these parameters being in particular dependent of the angular difference between the start and the end of the orientation change;

an astronomical calculation module 46 which calculates in real-time the position of the Sun, and therefore the direct orientation defined by the direction of the direct solar radiation at the level of the solar module 1;

a servo-control module 47 which calculates the servo-control of the orientation of the solar module 1, according to the evolution of the optimum orientation originating from the module 44, the different parameters originating from the module 45 and the direct orientation originating from the module 46, where this servo-control module 47 outputs an orientation setpoint toward the actuation system 6 in order to pilot changes of the orientation of the solar module 1, in other words of the platform 22 of the solar tracker 2.

It should be noted that this control unit 4 may be specific to the solar module 1, or shared between several solar modules, and preferably between several solar trackers arranged in line (extending from north to south) within linear solar plants.

In the two embodiments illustrated in FIGS. 3a and 3b (first embodiment) and in FIG. 4 (second embodiment), the measuring system 5 comprises a spherical-dome shaped support 53a for the first embodiment or a circular-ring shaped support 53b for the second embodiment.

In each embodiment, the support 53a, 53b supports photosensitive sensors 54, 55, in particular pyranometric-type sensors, with upper photosensitive sensors 54 on the top (facing the sky) and lower photosensitive sensors 55 on the bottom (facing the ground); these photosensitive sensors 54, 55 consist in particular of pyranometric-type sensors.

The upper photosensitive sensors 54 form, together with the top portion of the concerned support 53a, 53b, the upper measuring device 51, whereas the lower photosensitive sensors 55 form, together with the bottom portion of the concerned support 53a, 53b, the lower measuring device 52.

The photosensitive sensors 54, 55 are distributed according to several elevation angles called $\Theta Si$ for the upper photosensitive sensors 54 and $\Theta Nk$ for the lower photosensitive sensors 55; these elevation angles $\Theta Si$, $\Theta Nk$ being measured with respect to the vertical axis Z in the plane (Y, Z), the reference frame (X, Y, Z) being centered on the center O of the spherical dome 53a or the center O of the circular ring 53b; these elevation angles $\Theta Si$, $\Theta Ni$ being therefore to be matched with the orientation of the solar module 1.

In general, the photosensitive sensors 54, 55 are positioned along several strips (or rows) distributed according to several elevation angles $\Theta Si$, $\Theta Nk$. These elevation angles $\Theta Si$, $\Theta Nk$ are also shown in FIG. 6. The strips are distributed between upper strips BSi which comprise one or several upper photosensitive sensor(s) 54, and lower strips BNk which comprise one or several lower photosensitive sensor(s) 55.

In the first embodiment, on each strip lie one or several photosensitive sensor(s) 54, 55. In the case of a strip with several photosensitive sensors 54, 55, the photosensitive sensors 54, 55 of the same strip are distributed according to several azimuth angles called RSj for the upper photosensitive sensors 54 and RNm for the lower photosensitive sensors 55; these azimuth angles RSj, RNm being measured with respect to the vertical axis Z in the plane (X, Z). Thus, besides being distributed according to the strips at different elevation angles $\Theta Si$, $\Theta Nk$, the photosensitive sensors 54, 55 are also distributed according to columns at different azimuth angles RSj, RNm. These azimuth angles RSj, RNm are shown in FIG. 6. The columns are distributed between upper columns CSi which comprise one or several upper photosensitive sensor(s) 54, and lower columns CNm which comprise one or several lower photosensitive sensor(s) 55.

In the second embodiment, on each strip lies one single photosensitive sensor 54 or 55, such that there is only one single upper column and one single lower column.

In FIG. 6, in an example of a first measuring system 5, the upper photosensitive sensors 54 are distributed according to four upper strips BS1, BS2, BS3, BS4 which are associated to four elevation angles $\Theta S1$, $\Theta S2$, $\Theta S3$, $\Theta S4$, and according to four upper columns CS1, CS2, CS3, CS4 which are associated to four azimuth angles RS1, RS2, RS3, RS4, and the lower photosensitive sensors 55 are distributed according to four lower strips BN1, BN2, BN3, BN4 which are associated to four elevation angles $\Theta N1$, $\Theta N2$, $\Theta N3$, $\Theta N4$, and according to four lower columns CN1, CN2, CN3, CN4 which are associated to four azimuth angles RN1, RN2, RN3, RN4.

In general, the more the measuring system 5 comprises photosensitive sensors 54, 55, and in particular the more the observation system 2 comprises strips of photosensitive sensors 54, 55, and the better will be the resolution and the angular accuracy.

These photosensitive sensors 54, 55 may be of the same technology as the faces 31, 32 associated to the photovoltaic device 3 in order to enable the application of a weighting dependent of the useful wavelength range of the faces 31, 32. Preferably, these photosensitive sensors 54, 55 will undergo a prior calibration in order to obtain a better accuracy.

With the first measuring system 5, by recovering the measurements of the luminosity of each photosensitive sensor 54, 55 and knowing the elevation angles $\Theta Sk$, $\Theta Nk$ of the different strips and the azimuth angles RSj, RNm of the different columns, the cartographic module 40 converts a measurement performed by the measuring system 5 into a pair of mappings comprising an incident luminance mapping CLI (obtained with the measurements originating from the upper photosensitive sensors 54) and a reflected luminance mapping CLR (obtained with the measurements originating from the lower photosensitive sensors 55).

Beforehand, the cartographic module 40 implements a frequency weighting applied on the measurements performed by the photosensitive sensors 54, 55; this frequency weighting consisting in applying a frequency filter on these measurements which is dependent of both the frequency response of the photosensitive sensors 54, 55 and the useful frequency band (or spectral response) of the photovoltaic cells of the photovoltaic device 3.

Afterwards, the cartographic module 40 implements a possible processing consisting in correcting the measurements from defects or parasitic noises. Then, the cartographic module 40 implements a calculation of the distribution of the solar luminance (by matching the measurements of the photosensitive sensors 54, 55 with their coordinates in the space or directly with their respective elevation angles) in order to generate a raw incident luminance mapping and a raw reflected luminance mapping, each forming a solar luminance map (or matrix) distributed according to several strips associated respectively to different elevation angles $\Theta Si$, $\Theta Nk$ and, where appropriate, according to several columns associated respectively to different azimuth angles RSj, RNm.

Finally, the cartographic module 40 applies on each raw mapping a specific coefficient dependent of the variation of the sensitivity of the photosensitive sensors 54, 55, in order to generate the incident luminance mapping CLI and the reflected luminance mapping CLR which will be exploited to establish the optimum orientation. Indeed, the magnitudes (or luminosities) of the measurements delivered by the photosensitive sensors 54, 55 are proportionally related to the values of the (incident or reflected) solar radiation, so that these coefficients take into account these proportionalities depending on the variations of sensitivity of the respective photosensitive sensors 54, 55.

The incident luminance mapping CLI forms a solar luminance map (or matrix) distributed according to:
- several higher strips 50S(i) (i being an integer) established according to a first direction parallel to the axis of rotation A (and therefore parallel to the axis X) and associated respectively to different elevation angles ΘSi, so that each strip 50S(i) corresponds to an elevation angle ΘSi (each strip 50S(i) of the mapping CLI being associated to a strip BSi of the measuring system 5); and
- several upper columns 51S(j) (j being an integer) established according to a second direction horizontal and orthogonal to the axis of rotation A (and therefore parallel to the axis Y) and associated respectively to different azimuth angles RSj (each column 51S(j) of the mapping CLI being associated to a column CSj of the measuring system 5).

Thus, the incident luminance mapping CLI comprises N cells (where N=[i×j]), and to each cell corresponds one (absolute or relative) solar luminance value LumS(i,j). It is possible that some cells are empty, because the strips BSi do not necessarily comprise the same number of upper photosensitive sensors 54, and in this case the solar luminance value LumS(i,j) is zero for an empty cell.

In the example of FIG. 5, the incident luminance mapping CLI comprises five strips 50S(1), . . . , 50S(5) and seven columns 51S(1), . . . , 51S(7), and the solar luminance values are expressed as relative percentages.

The reflected luminance mapping CLR forms a solar luminance map (or matrix) distributed according:
- several lower strips 50N(k) (k being an integer) established according to a first direction parallel to the axis of rotation A (and therefore parallel to the axis X) and associated respectively to different elevation angles ΘNk, so that each strip 50N(k) corresponds to an elevation angle ΘNk (each strip 50N(k) of the mapping CLR being associated to a strip BNk of the measuring system 5); and
- several lower columns 51N(m) (m being an integer) established according to a second direction horizontal and orthogonal to the axis of rotation A (and therefore parallel to the axis Y) and associated respectively to different azimuth angles RNm (each column 51N(m) of the mapping CLR being associated to a column CNm of the measuring system 5).

Thus, the reflected luminance mapping CLR comprises P cells (where P=[k×m]), and to each cell corresponds one (absolute or relative) solar luminance value LumN(k,m). It is possible that some cells are empty, because the strips BNk do not necessarily comprise the same number of lower photosensitive sensors 55, and in this case the solar luminance value LumN(k,m) is zero for an empty cell.

In the example of FIG. 5, the reflected luminance mapping CLR comprises five strips 50N(1), . . . , 50N(5) and seven columns 51N(1), . . . , 51N(7), and the solar luminance values are expressed as relative percentages.

From such a pair of mappings CLI, CLR, the optimum orientation calculation module 43 implements a calculation based on these mappings CLI, CLR to extract an optimum orientation Θopt which corresponds to an elevation angle associated to a maximum solar illuminance on the two faces 31, 32 of the photovoltaic device 3.

For this calculation, and referring to FIGS. 5 and 6, the optimum orientation calculation module 43 implements a succession of substeps. This succession of substeps constitutes a calculation or algorithm example, and the invention would not, of course, be limited to this example.

At a first substep, the optimum inclination angle calculation module 43 calculates, for each strip 50S(i) of the incident luminance mapping CLI, an equivalent luminance value LeqS(i) from the set of luminance values LumS(i,j) taken in the strip 50S(i). For each strip 50S(i), the equivalent luminance value LeqS(i) of the strip 50S(i) is a function of the luminance values LumS(i,j) taken in the strip 50(i) and of the azimuth angles RSj of the different columns 51S(j) according to the following formula (referring to FIG. 6):

$$LeqS(i) = \sum_j LumS(i, j) \times \cos RSj$$

Thus, we obtain a matrix MLeqS of the equivalent luminance values LeqS(i) associated to the different strips 50S(i).

Similarly, the optimum inclination angle calculation module 43 calculates, for each strip 50N(k) of the reflected luminance mapping CLR, an equivalent luminance value LeqN(k) from the set of luminance values LumN(k,m) taken in the strip 50N(k). For each strip 50N(k), the equivalent luminance value LeqS(i) of the strip 50N(k) is a function of the luminance values LumN(k,m) taken in the strip 50N(k) and of the azimuth angles RSm of the different columns 51N(m) according to the following formula (referring to FIG. 6):

$$LeqN(k) = \sum_{jm} LumN(k, m) \times \cos RNm$$

Thus, we obtain a matrix MLeqN of the equivalent luminance values LeqN(k) associated to the different strips 50N(k).

At a second substep, the optimum orientation calculation module 43 calculates, for several theoretical elevation angles Θth, a value Lperc(Θth) of the luminance perceived by the faces 31, 32 of the solar module 1 from the equivalent luminance values LeqS(i) and LeqN(k) calculated for all strips at the first substep, and from the angular differences between the theoretical elevation angles Θth and the elevation angles ΘSi, ΘNk associated to the strips, according to the following formula (referring to FIG. 6):

$$Lperc(\theta th) = \sum_i LeqS(i) \cdot \cos(\theta Si - \theta th) \cdot p(i) + \sum_k LeqN(k) \cdot \cos(\theta Nk - \theta th) \cdot p(k)$$

Where p(i)=1 if abs(ΘSi−Θth)<90 degrees, and p(i)=0 otherwise;

and p(k)=1 if abs(ΘNk−Θth)<90 degrees, and p(k)=0 otherwise.

The coefficients p(i), p(k) take into account that, beyond an angular difference of 90 degrees, the radiation is not received by the corresponding photosensitive sensor(s) 54, 55.

Thus, we obtain a curve of the variation of the perceived luminance value Lperc(Θth) as a function of the theoretical elevation angle Θth.

At a last substep, the optimum orientation calculation module 43 retains the optimum orientation Θopt as being the theoretical elevation angle Θth associated to a maximum of the perceived luminance value Lperc(Θth).

In the case where the measuring system 5 is in accordance with the second embodiment, the mappings CLI, CLR are equivalent to the matrices MLeqS and MLeqN, so that the calculations implemented by the optimum orientation calculation module 43 starts at the second substep.

It should be noted that, in a non-illustrated variant, the two measuring devices 51, 52 are made in the form of two cameras, in particular hemispherical type cameras, arranged back to each other, with an upper camera turned toward the sky in order to extract images of the sky and measure the distribution of the incident solar luminance, and a lower camera turned toward the ground in order to extract images of the ground and measure the distribution of the reflected solar luminance. Advantageously, each camera is configured to take images within a spectral width sufficient for the technology of the photovoltaic cells of the faces 31, 32 of the photovoltaic device 3. Each camera delivers a raw image, respectively of the sky and of the ground, which is delivered afterwards to the cartographic module 40 for converting these two raw images into mappings CLI, CLR equivalent to those described hereinabove, after a succession of image processing steps starting from the raw images until the mappings CLI, CLR:
- a frequency weighting step;
- a processing step consisting in correcting the defects on the images after weighting (noise suppression processing, blooming processing, saturation processing, . . . );
- calculation (either pixel-by-pixel, or area-by-area where each area comprises several pixels) of the distribution of the solar luminance;
- application on each processed image of a specific coefficient dependent of the variation of the sensitivity of the concerned camera.

The predictive calculation module 42 calculates predictive incident luminance mappings CLIP and predictive reflected luminance mappings CLRP for future time points (t+nP), where n is a non-zero integer and P the period of the observation carried out periodically and repetitively by the measuring system 5. These predictive mappings CLIP, CLRP are established on the basis of the mappings CLI, CLR generated in real-time by the cartographic module 40 and on the basis of the past mappings CLI, CLR archived in the archiving module 41.

From the successive incident luminance mappings CLI, the predictive calculation module 42 has access, more or less accurately, to a localization of the clouds, as well as their dimensions, their directions of displacement and their displacement speeds. Thus, the predictive calculation module 42 can implement a predictive calculation of the position of the clouds at future time points.

The predictive calculation is based on the consideration of the past evolution of the distribution of the incident solar luminance, between several past time points and the current time point, and in particular the evolution of the distribution of the incident solar luminance and of the speed of evolution of the incident solar luminance.

This predictive calculation may be based on a sliding time window, that is to say a window comprising a predefined number of the last past mappings.

This predictive calculation is used to establish short-term predictive mappings CLIP, CLRP (or mapping forecasts). As a non-limiting example, the short-term notion covers calculations over a future time period of at most ten to thirty minutes, or at most one to two hours. Of course, it is possible to consider providing for predictive calculations over a longer term.

The algorithm implemented for such a predictive calculation may possibly integrate improvements such as:
- the consideration of the forecast errors in order to improve the future forecasts (indeed, it is possible to compare the current mappings with the cartographic forecasts performed earlier, in order to draw out lessons regarding the predictive calculation and improve it);
- recognize the cloud types according to the incident luminance mappings CLI thanks to a database and/or thanks to analyses or readings performed in the past, so as to allow making forecasts over a longer term depending on the types of clouds.

The algorithm implemented for such a predictive calculation may also take into account the evolution of the position of the Sun in the sky, in particular if the predictive calculation is performed for future time points far enough (for example beyond 30 minutes) for the change of the position of the Sun having any influence on the evolution of the incident or reflected solar luminance. This consideration of the position of the Sun in the predictive calculation is illustrated by the connecting arrow in dashed line in FIG. 8 between the predictive calculation module 42 and the astronomical calculation module 46.

As shown in FIG. 7, the predictive calculation module 42 establishes predictive mappings CLIP, CLRP, and to each pair of predictive mappings CLIP, CLRP is associated a predictive optimum orientation Θopt calculated by the optimum orientation calculation module 43, according to the same previously-described calculation method.

Thus, the optimum orientation evolution module 44 recovers all the optimum orientations (those of the past mappings CLI, CLR, those of the current mappings CLI, CLR, and those of the predictive mappings CLIP, CLRP) and establishes a future evolution of the optimum orientation Θopt, thereby enabling forecast and anticipation of the optimum orientation changes.

Finally, the servo-control module 47 servo-controls the orientation of the solar module 1 according to the past and future evolution of the optimum orientation Θopt, and also according to the energy consumption Cons necessary to modify the orientation of the solar module 1, the rotational displacement speed of the solar module 1, and the supplemental solar energy production Prod obtained with an orientation change.

Referring to FIGS. 9 and 10, the servo-control module 47 is based on the future evolution of the optimum orientation Θopt (first curve starting from the top).

In the given example, the predictive optimum orientation Θopt changes in value so as to reach a target value Θc, for example because of a forecast of the passage of a cloud in front of the Sun, from the future time point t1 until the future time point t2, before returning back to its initial value.

The servo-control module 47 establishes a potential scenario during which the orientation Θ of the solar module 1 is modified starting from a current orientation Θp until reaching the target optimum orientation Θc, in order to follow the forecast of the evolution of the optimum orientation.

In the given example, the scenario consists in servo-controlling the orientation Θ on the first curve, and this servo-control depends on the rotational displacement speed of the solar module 1, in order to obtain a second curve of the evolution of the orientation Θ of the solar module 1 during the orientation change of the scenario. Indeed, the solar module 1 presents a displacement time necessary to be able to reach the target optimum orientation Θc.

Thanks to the predictive calculation, the displacement of the solar module 1 is anticipated, in this instance by starting earlier at the time point t10 (anterior to t1) until reaching the target value Θc at t11 (subsequent to t1), and then by starting in an anticipated manner the return at the time point t11 (anterior to t2) until returning back to the current orientation Θp at the time point t13 (subsequent to t2).

The servo-control module 47 determines the evolution of the energy consumption Cons necessary to modify the orientation of the solar module 1 according to the second curve, in order to obtain a third curve of the evolution of this energy consumption Cons; the solar module 1 consuming during the orientation change phases, between the time points t10 and t11 and then between the time points t12 and t13.

The servo-control module 47 determines the evolution of the expected supplemental production Prod (or production gain) by following the second curve of the evolution of the orientation Θ rather than remaining at the current orientation Θp, in order to obtain a fourth curve of the evolution of this production Prod. Hence, this supplemental production Prod corresponds to the expected production gain if the scenario is followed rather than remaining at the initial or current situation on the current orientation Θp.

In the given example, the production Prod is negative between the time points t10 and t1 and between the time points t2 and t13 which correspond to periods where the orientation Θ departs from the optimum orientation Θopt, and the production Prod is positive between the time points t1 and t2 which correspond to a period where the orientation θ approaches and even becomes equal to the optimum orientation Θopt.

The servo-control module 47 determines the evolution of the expected energy yield Rend based on the difference between the energy production Prod and consumption Cons, resulting in a fifth curve corresponding to the difference between the fourth curve and the third curve, in other words Rend=Prod−Cons.

In the given example, the yield Rend is negative between the time points t10 and t1 and between the time points t2 and t13, and the yield Rend is positive between the time points t1 and t2.

Finally, the servo-control module 47 follows the scenario (in other words servo-controls the solar module according to the second curve) if the energy yield is globally positive for the scenario, otherwise the orientation of the solar module 1 is maintained at the current orientation Θp.

The overall energy yield is established by studying the yield over the entire period of the scenario.

In the example of FIG. 9, the overall yield is negative, because the sum of the surfaces Srn where the yield is negative (between t10 and t1 and between t2 and t13) is larger than the surface Srp where the yield is positive (between t1 and t2). For example, the example of FIG. 11 corresponds to a situation where the predictive passage time (corresponding to the interval [t2−t1]) of a cloud in front of the Sun is too short in comparison with the time necessary for an orientation change (corresponding to the interval [t1−t10] or [t13−t2]).

In the example of FIG. 10, the overall yield is positive, because the sum of the surfaces Srn where the yield is negative (between t10 and t1 and between t2 and t13) is smaller than the surface Srp where the yield is positive (between t1 and t2). For example, the example of FIG. 10 corresponds to a situation where the predictive passage time (corresponding to the interval [t2−t1]) of a cloud in front of the Sun is long in comparison with the time necessary for an orientation change (corresponding to the interval [t1−t10] or [t13−t2])

Thus, in the example of FIG. 9, the servo-control module 47 does not follow the scenario and maintains the orientation at the current value Θp, whereas in the example of FIG. 10, the servo-control module 47 follows the scenario and ensures a servo-control of the inclination angle according to the second curve.

Figure 1:
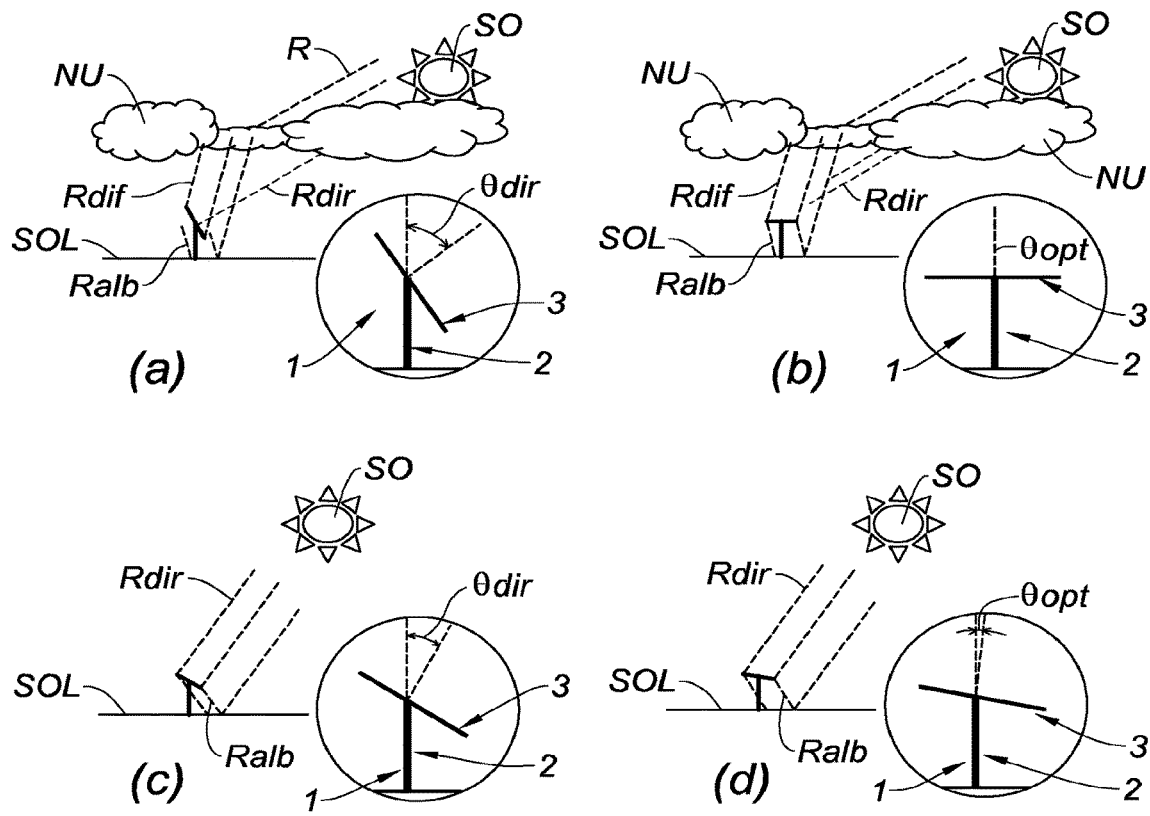

Referring to FIGS. 1(a) and 1(b), the method in accordance with the invention is implemented in FIG. 1(b) with an orientation of the solar module 1 on an optimum orientation Θopt distinct from the direct orientation Θdir (orientation on the direct radiation facing the Sun SO), whereas in FIG. 1(a) is implemented an orientation of the solar module 1 on the direct orientation Θdir. With the presence of clouds NU in front of the Sun SO, the direct incident solar radiation Rdir is lower than the diffuse incident solar radiation Rdif, so that the servo-control on the direct orientation Θdir procures a lower yield than the servo-control on the optimum orientation Θopt established thanks to the method (which takes into account the diffuse radiation Rdif and also the albedo radiation Ralb), so that the method enables an increase of the energy production by the solar module 1.

Referring to FIGS. 2(a) and 2(b), the method in accordance with the invention is implemented in FIG. 2(b) with an orientation of the solar module 1 on an optimum orientation Θpt distinct from the direct orientation Θdir, whereas in FIG. 2(a) is implemented an orientation of the solar module 1 on the direct orientation Θdir. With the presence of a high albedo solar radiation Ralb due to a ground SOL having a high reflectance, the servo-control on the direct orientation Θdir turns out to procure a lower yield than the servo-control on the optimum orientation Θpt established thanks to the method which takes into account the high albedo radiation Ralb, because the servo-control on the direct orientation Θdir will limit the consideration of the albedo radiation Ralb.

Of course, the example of implementation mentioned hereinabove is not limiting and other improvements and details may be added to the solar tracker according to the invention, nevertheless without departing from the scope of the invention where other types of fixed structure or platform may be for example carried out.

The invention claimed is:

1. A method for controlling the orientation of a bifacial solar module supported by a solar tracker, the method comprising:

measuring a distribution of incident solar luminance corresponding to solar radiation from the sky that reaches an upper face of the bifacial solar module, the measuring the distribution of incident solar luminance comprising measuring incident solar luminance at a plurality of elevation angles corresponding to a plurality of orientations of the bifacial solar module relative to horizontal;

measuring a distribution of reflected solar luminance corresponding to solar radiation reflected from the ground that reaches a lower face of the bifacial solar module, the measuring the distribution of reflected solar luminance comprising measuring reflected solar luminance at a plurality of elevation angles corresponding to a plurality of orientations of the bifacial solar module relative to horizontal;
determining an optimum orientation of the bifacial solar module based on the distribution of the incident solar luminance and on the distribution of the reflected solar luminance; and
controlling the solar tracker to orient the bifacial solar module to the optimum orientation.

2. The method according to claim 1, further comprising:
storing past measurements of the distribution of the incident solar luminance and of the distribution of the reflected solar luminance in memory;
storing the past optimum orientations determined for the past measurements of the distribution of the incident solar luminance and of the distribution of the reflected solar luminance in memory;
forecasting the future evolutions of the distribution of the incident solar luminance and of the distribution of the reflected solar luminance based on the past measurements of the distribution of the incident solar luminance and of the distribution of the reflected solar luminance;
calculating the future evolution of the optimum orientation according to the forecast of the future evolutions of the distribution of the incident solar luminance and of the distribution of the reflected solar luminance; and
controlling the orientation of the bifacial solar module on the optimum orientation based on the past optimum orientations and based on the future evolution of the optimum orientation.

3. The method according to claim 2, wherein forecasting the future evolutions of the distribution of the incident solar luminance and of the distribution of the reflected solar luminance is based on a weather forecast calculation in a location area of the bifacial solar module.

4. The method according to claim 1, wherein the determination of the optimum orientation of the bifacial solar module is also based on at least one of the following parameters:
an electrical energy consumption necessary to change the orientation of the bifacial solar module;
a wear rate of mechanical members of the solar tracker loaded during a change of the orientation of the bifacial solar module;
an angular speed of the solar tracker during a change of the orientation of the bifacial solar module;
an angular displacement of the solar tracker between a minimum orientation and a maximum orientation.

5. The method according to claim 1, wherein:
when measuring the distribution of the incident solar luminance, a frequency weighting is implemented as a function of a frequency response of photovoltaic cells of the upper face of the bifacial solar module; and
when measuring the distribution of the reflected solar luminance, a frequency weighting is implemented as a function of a frequency response of photovoltaic cells of the lower face of the bifacial solar module.

6. The method according to claim 1, wherein determining an optimum orientation includes:
converting the measurement of the distribution of the incident solar luminance into an incident luminance mapping defining a distribution of luminance values according to upper strips in a first direction, and according to upper columns in a second direction orthogonal to the first direction, wherein each upper strip is associated with an elevation angle and each upper column is associated with an azimuth angle;
converting the measurement of the distribution of the reflected solar luminance into a reflected luminance mapping defining a distribution of luminance values according to lower strips in the first direction, and according to lower columns in the second direction, wherein each lower strip is associated with an equivalent luminance value from the luminance values in the strip;
calculating, for theoretical elevation angles corresponding to orientations of the bifacial solar module, of luminance values perceived by the upper face and the lower face of the bifacial solar module from the equivalent luminance values and from the angular differences between the theoretical elevation angles and the elevation angles associated with the strips;
determining a theoretical elevation angle associated with a maximum of the perceived luminance values; and
selecting the theoretical elevation angle as the optimum orientation.

7. The method according to claim 1, wherein the measurements of the distribution of the incident solar luminance and of the distribution of the reflected solar luminance are performed by an image capturing device which captures images of the sky for measuring the distribution of the incident solar luminance and captures images of the ground for measuring the distribution of the reflected solar luminance.

8. The method according to claim 1, wherein the measurements of the distribution of the incident solar luminance and of the distribution of the reflected solar luminance are performed by a measuring system including photosensitive sensors with an upper measuring device having upper photosensitive sensors distributed facing the sky for measuring the distribution of the incident solar luminance and, a lower measuring device having lower photosensitive sensors distributed facing the ground for measuring the distribution of the reflected solar luminance.

9. The method according to claim 1, wherein controlling the orientation of the bifacial solar module is performed according to electrical energy consumption necessary to change the orientation of the bifacial solar module.

10. The method according to claim 9, further comprising:
determining a potential scenario during which the orientation of the bifacial solar module is changed starting from a current orientation until reaching the optimum orientation, wherein determining the potential scenario includes:
calculating an evolution of the orientation of the bifacial solar module during the orientation change starting from the current orientation until reaching the optimum orientation, the evolution of the orientation depending on a rotational displacement speed of the bifacial solar module;
calculating an evolution of the energy consumption to change the orientation of the bifacial solar module;
calculating an evolution of supplemental solar energy production expected with such an orientation change;
calculating an evolution of expected energy yield based on the difference between the solar energy production and the energy consumption; and
controlling the orientation of the bifacial solar module on the optimum orientation if the energy yield is globally positive for the scenario.

11. A system comprising:
a solar tracker, an actuation system configured to actuate motion of the solar tracker;

a bifacial solar module supported by the solar tracker an upper measuring device configured to measure a distribution of incident solar luminance corresponding to incident solar radiation from the sky and reaching the upper face of the bifacial solar module, wherein the distribution of the incident solar luminance is distributed according to elevation angles corresponding to orientations of the bifacial solar module;

a lower measuring device configured to measure a distribution of the reflected solar luminance corresponding to the reflection of solar radiation from the ground and reaching the lower face, of the bifacial solar module, wherein the distribution of the reflected solar luminance is distributed according to elevation angles corresponding to orientations of the bifacial solar module; and a controller coupled to the upper and lower measuring devices and to the actuation system for controlling the motion of the solar tracker, wherein the controller is configured to perform the method of claim 1.

12. The method according to claim 1, wherein determining the optimum orientation of the bifacial solar module comprises determining an elevation angle of the bifacial solar module associated with a maximum solar illuminance on the upper face and the lower face of the bifacial solar module.

13. The method according to claim 12, wherein determining the optimum orientation of the bifacial solar module comprises determining the elevation angle of the bifacial solar module associated with a maximum incident solar luminance reaching the upper face of the bifacial solar module and with a maximum reflected solar luminance reaching the lower face of the bifacial solar module.

14. The method according to claim 1, wherein determining the optimum orientation of the bifacial solar module comprises determining an elevation angle of the bifacial solar module associated with a maximum energy production of the bifacial solar module.

* * * * *